United States Patent [19]
Fujii

[11] Patent Number: 5,779,581
[45] Date of Patent: Jul. 14, 1998

[54] TOP PULL FRONT DERAILLEUR

[75] Inventor: Kazuhiro Fujii, Sakai, Japan

[73] Assignee: Shimano, Inc., Osaka, Japan

[21] Appl. No.: 666,001

[22] Filed: Jun. 19, 1996

[51] Int. Cl.[6] .................................................. F16H 61/00
[52] U.S. Cl. .................................................. 474/82; 474/80
[58] Field of Search .................................. 474/82, 80, 78, 474/69, 119, 122, 127; 280/260, 261

[56] References Cited

U.S. PATENT DOCUMENTS

| | | | |
|---|---|---|---|
| 4,226,130 | 10/1980 | Isobe | 474/82 |
| 5,104,358 | 4/1992 | Kobayashi | 474/82 |

*Primary Examiner*—Roger J. Schoeppel
*Attorney, Agent, or Firm*—James A. Deland

[57] ABSTRACT

A bicycle front derailleur includes a base member for attachment to a bicycle frame, a chain guide for guiding a chain laterally inwardly and outwardly of the bicycle frame, an inner link member having a first end pivotably coupled to the base member and a second end coupled to the chain guide, an outer link member having a first end pivotably coupled to the base member and a second end coupled to the chain guide, biasing means for biasing the chain guide laterally inwardly, and an actuating arm fixed to the outer link member for integral movement therewith. The actuating arm extends laterally outwardly from the outer link member so that pulling the actuating arm upwardly causes the chain guide to move laterally outwardly.

10 Claims, 3 Drawing Sheets

TOP PULL FRONT DERAILLEUR

BACKGROUND OF THE INVENTION

The present invention is directed to bicycle derailleurs and, more particularly, to a front derailleur which operates by pulling upwardly on an actuating arm.

U.S. Pat. No. 5,104,358 discloses one type of front derailleur which operates by pulling upwardly on an actuating arm. The derailleur disclosed in that patent includes a base member for attachment to a seat tube of a bicycle frame, an inner link member, an outer link member, and a movable member having a chain guide. The components form a parallelogrammatic pantographic link mechanism that is biased inwardly by a spring so as to return the chain guide to the smallest sprocket of a multiple sprocket chainwheel assembly. An actuating arm extends outwardly from an upper end of the inner link member so that the chain guide moves laterally outwardly when the actuating arm is pulled upwardly.

In this type of derailleur, the actuating arm extends across the outer link member and terminates with a derailleur cable fixing bolt. Because the actuating arm extends from the inner link member in close proximity to the other derailleur components, mud and debris may lodge between the components which can affect shifting performance. Furthermore, the close proximity of the actuating arm to the other components makes the actuating arm difficult to clean. This, in turn, promotes rust and increased friction and wear of the components. The problems resulting from lack of space between components can be somewhat overcome by increasing the space between the components. However, the space between the actuating arm and the link members cannot be increased arbitrarily to prevent such problems, because unwanted torque between the actuating arm and the link members increases as the longitudinal distance between the actuating arm and the link members increases.

SUMMARY OF THE INVENTION

The present invention is directed to a front derailleur of the type which operates by pulling upwardly on an actuating arm, but wherein the actuating arm does not increase maintenance difficulties and, in a more specific embodiment, does not produce unwanted torque on the remaining components. In one embodiment of the present invention, a bicycle front derailleur comprises a base member for attachment to a bicycle frame, a chain guide for guiding a chain laterally inwardly and outwardly of the bicycle frame, an inner link member having a first end pivotably coupled to the base member and a second end coupled to the chain guide, an outer link member having a first end pivotably coupled to the base member and a second end coupled to the chain guide, biasing means for biasing the chain guide laterally inwardly, and an actuating arm fixed to the outer link member for integral movement therewith. The actuating arm extends laterally outwardly from the outer link member so that pulling the actuating arm upwardly causes the chain guide to move laterally outwardly.

DETAILED DESCRIPTION OF THE EMBODIMENTS

Figure 1:
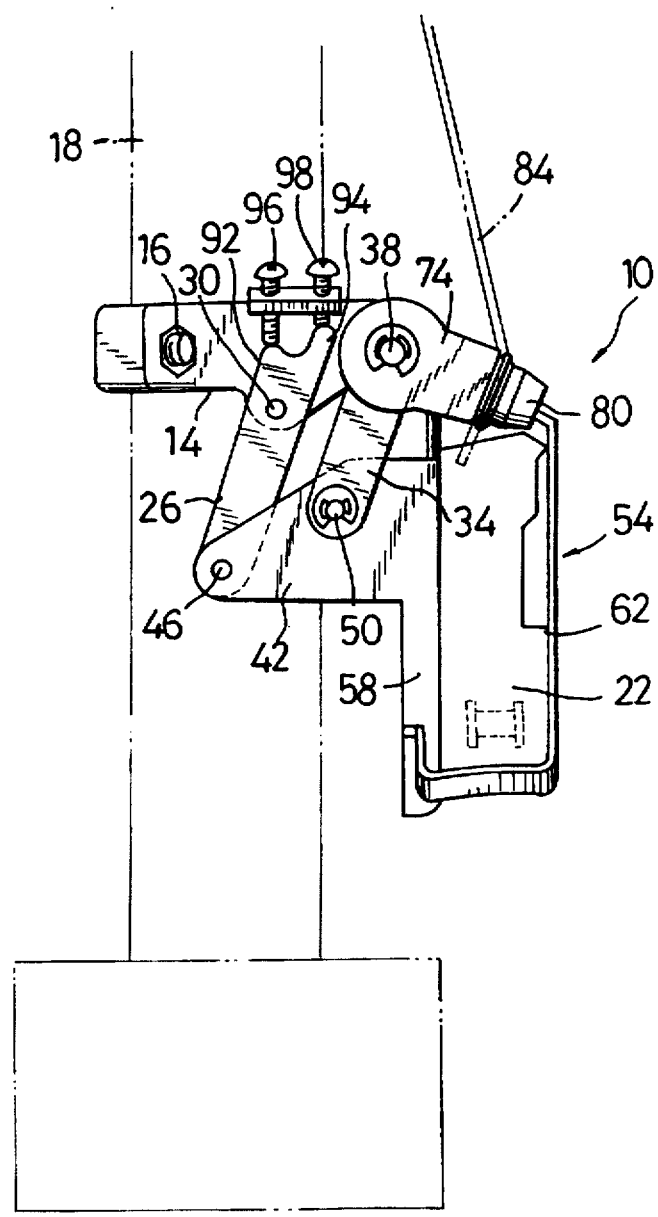
FIG. 1 is a rear view of a particular embodiment of a top pull front derailleur according to the present invention.

FIG. 1 is a rear view of a particular embodiment of a top pull front derailleur 10 according to the present invention for shifting a chain 22 laterally among a plurality of chainwheels (not shown). Derailleur 10 includes a base member 14 having a clamp member 15 (FIG. 3) for attaching the derailleur to a seat tube 18 or other structural member of the bicycle in a known manner using a screw 16. An inner link member 26 has an upper end pivotably coupled to base member 14 through a pivot pin 30, and an outer link member 34 has an upper end pivotably coupled to base member 14 through a pivot pin 38. Similarly, inner link member 26 has a lower end pivotably coupled to a fixing member 42 through a pivot pin 46, and outer link member 34 has a lower end pivotably coupled to fixing member 42 through a pivot pin 50. As used herein, the terms "inner," "outer," "upper," and "lower" are defined relative to the seat tube and oriented as shown in FIG. 1.

Fixing member 42 is coupled to a chain guide 54 comprising an inner guide plate 58 and an outer guide plate 62. In this embodiment fixing member 42 is integrally formed with inner guide plate 58, and inner guide plate 58 is coupled to outer guide plate 62 through an upper bridge member 66 (FIG. 3) and a rear bridge member 70. When assembled to the bicycle, chain 22 passes between inner guide plate 58 and outer guide plate 62 in the manner shown in FIG. 1.

Figure 3:
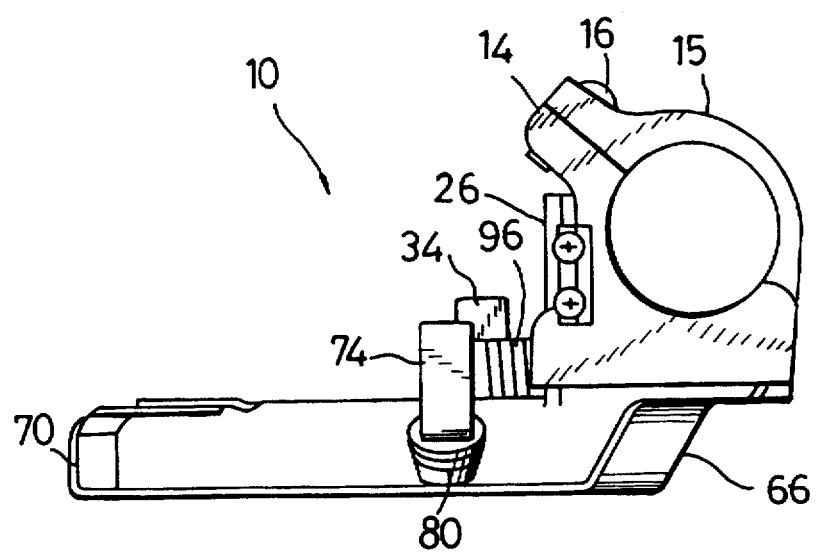
FIG. 3 is a top view of the derailleur shown in FIG. 1.

An actuating arm 74 extends laterally outwardly from the upper end of outer link member 34, and a cable fixing bolt 80 is provided for fixing an end of a derailleur cable 84 to actuating arm 74. In this embodiment, actuating arm 74 is formed as one piece with outer link member 34 to minimize the longitudinal distance between actuating arm 74 and outer link member 34. This, in turn, reduces the torque created by the distance between cable 84 and outer link member 34. As shown in FIG. 3, actuating arm is formed slightly offset from outer link member 34, but if desired actuating arm 74 can be formed to lie fully within the plane of movement of outer link member 34 to essentially eliminate any undesirable torque between actuating arm 74 and outer link member 34. Since actuating arm 74 extends outwardly from outer link member 34, actuating arm 74 does not crowd the other components, thus making accumulation of mud or trapping of foreign objects such as twigs, etc. unlikely. Actuating arm 74 also is easy to clean. In this embodiment, cable fixing bolt 80 is located on the free end of actuating arm 74 in a position which does not extend laterally outwardly beyond outer guide plate 62. This prevents bolt 80 from interfering with the cyclist's foot.

Figure 2:
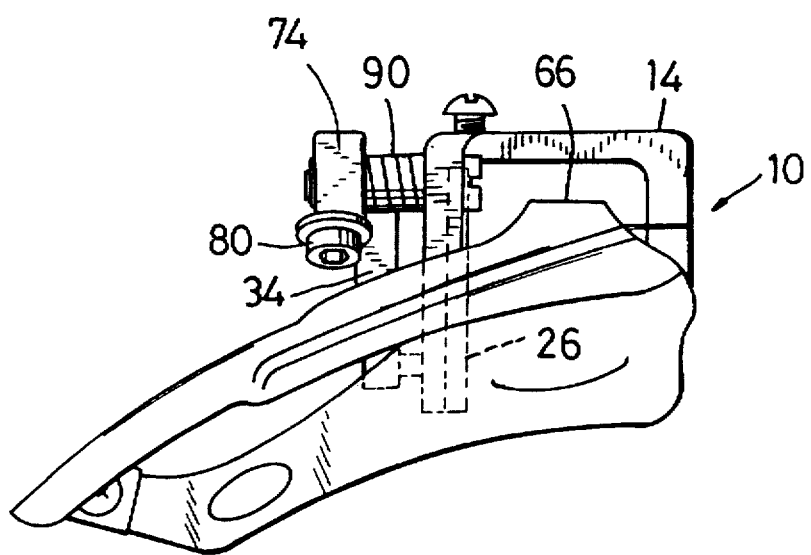
FIG. 2 is a side view of the derailleur shown in FIG. 1.

A spring 90 (FIG. 2) is provided about pivot pin 38 for biasing chain guide 54 inwardly in a well known manner. Pulling on derailleur cable 84 thus causes chain guide 54 to move laterally outwardly against the force of spring 90, and releasing derailleur cable 84 allows chain guide 54 to move laterally inwardly as a result of the force of spring 90. To set the range of motion of chain guide 54, inner link member 26 includes stops 92 and 94 for selectively abutting against adjusting screws 96 and 98, respectively, in a well known manner.

While the above is a description of various embodiments of the present invention, further modifications may be employed without departing from the spirit and scope of the present invention. For example, actuating arm 74 may extend from any desired location of outer link member 34, and actuating arm 74 need not be formed as one piece with outer link member 34. Thus, the scope of the invention should not be limited by the specific structures disclosed. Instead, the true scope of the invention should be determined by the following claims. Although labeling symbols are used in the claims in order to facilitate reference to the figures, the present invention is not intended to be limited to-the constructions in the appended figures by such labeling.

What is claimed is:

1. A bicycle front derailleur comprising:

a base member (14) for attachment to a bicycle frame (18);

a chain guide (54) for guiding a chain (22) laterally inwardly and outwardly of the bicycle frame (18);

an inner link member (26) having a first end pivotably coupled to the base member (14) and a second end coupled to the chain guide (54);

an outer link member (34) having a first end pivotably coupled to the base member (14) and a second end coupled to the chain guide (54);

biasing means (90) for biasing the chain guide (54) laterally inwardly; and an actuating arm (74) directly connected to the outer link member (34) for integral movement with the outer link member (34) and extending laterally outwardly from the outer link member (34) so that pulling the actuating arm (74) upwardly causes the chain guide (54) to move laterally outwardly.

2. A bicycle front derailleur comprising:

a base member (14) for attachment to a bicycle frame (18);

a chain guide (54) for guiding a chain (22) laterally inwardly and outwardly of the bicycle frame (18);

an inner link member (26) having a first end pivotably coupled to the base member (14) and a second end coupled to the chain guide (54);

an outer link member (34) having a first end pivotably coupled to the base member (14) and a second end coupled to the chain guide (54);

biasing means (90) for biasing the chain guide (54) laterally inwardly;

an actuating arm (74) fixed to the outer link member (34) for integral movement with the outer link member (34) and extending laterally outwardly from the outer link member (34) so that pulling the actuating arm (74) upwardly causes the chain guide (54) to move laterally outwardly; and wherein the outer link member (34) pivots about the base member (14) at a pivot location (38), and wherein the actuating arm (74) extends from the pivot location (38).

3. The derailleur according to claim 1 wherein the inner link member (26) is pivotably coupled to the base member (14) through a first pivot pin (30), wherein the outer link member (34) is pivotably coupled to the base member (14) through a second pivot pin (38), and wherein the actuating arm (74) originates at the second pivot pin (38).

4. The derailleur according to claim 3 wherein the second end of the inner link member (26) is pivotably coupled to the chain guide (54), and wherein the second end of the outer link member (34) is pivotably coupled to the chain guide (54).

5. The derailleur according to claim 4 wherein the chain guide (54) comprises:

an inner guide plate (58);

an outer guide plate (62);

a bridging member (66,70) connected between the inner guide plate (58) and the outer guide plate (62); and a fixing member (42) coupled to the inner guide plate (58), to the inner link member (26) and to the outer link member (34).

6. The derailleur according to claim 5 wherein the actuating arm (74) extends laterally outwardly no further than the outer guide plate (62).

7. The derailleur according to claim 6 further comprising a cable fixing bolt (80) disposed on a free end of the actuating arm (74), wherein the cable fixing bolt (80) extends laterally outwardly no further than the outer guide plate (62).

8. A bicycle front derailleur comprising:

a base member (14) for attachment to a bicycle frame (18);

a chain guide (54) for guiding a chain (22) laterally inwardly and outwardly of the bicycle frame (18);

an inner link member (26) having a first end pivotably coupled to the base member (14) and a second end coupled to the chain guide (54);

an outer link member (34) having a first end pivotably coupled to the base member (14) and a second end coupled to the chain guide (54);

biasing means (90) for biasing the chain guide (54) laterally inwardly; and an actuating arm (74) originating at the outer link member (34) for integral movement with the outer link member (34) and extending laterally outwardly from the outer link member (34) so that pulling the actuating arm (74) upwardly causes the chain guide (54) to move laterally outwardly.

9. A bicycle front derailleur comprising:

a base member (14) for attachment to a bicycle frame (18);

a chain guide (54) for guiding a chain (22) laterally inwardly and outwardly of the bicycle frame (18);

an inner link member (26) having a first end pivotably coupled to the base member (14) and a second end coupled to the chain guide (54);

an outer link member (34) having a first end pivotably coupled to the base member (14) and a second end coupled to the chain guide (54);

biasing means (90) for biasing the chain guide (54) laterally inwardly; and an actuating arm (74) coupled to the outer link member (34) at an intersection between the actuating arm (74) and the outer link member (34), wherein the actuating arm extends laterally outwardly from the outer link member (34) so that pulling the actuating arm (74) upwardly causes the chain guide (54) to move laterally outwardly.

10. The derailleur according to claim 9 wherein the actuating arm (74) moves at an equal rate with the outer link member (34).

* * * * *